United States Patent
Annavajjala et al.

(10) Patent No.: US 8,284,862 B2
(45) Date of Patent: Oct. 9, 2012

(54) METHOD FOR ENCODING DATA SYMBOLS WITH IMPLICITLY EMBEDDED PILOT SYMBOLS IN RESOURCE BLOCKS FOR WIRELESS NETWORKS

(75) Inventors: Ramesh Annavajjala, Quincy, MA (US); Philip V. Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 343 days.

(21) Appl. No.: 12/827,591

(22) Filed: Jun. 30, 2010

(65) Prior Publication Data
US 2012/0002753 A1    Jan. 5, 2012

(51) Int. Cl.
*H04L 27/36* (2006.01)
(52) U.S. Cl. ........ 375/298; 375/260; 375/261; 375/267; 375/295; 375/299

(58) Field of Classification Search .................. 375/260, 375/261, 267, 295, 298, 299
See application file for complete search history.

(56) References Cited

U.S. PATENT DOCUMENTS

| | | | |
|---|---|---|---|
| 6,185,258 B1 | 2/2001 | Alamouti | |
| 7,643,589 B2 * | 1/2010 | Calderbank et al. | 375/347 |
| 8,090,063 B2 * | 1/2012 | Lee et al. | 375/347 |

* cited by examiner

*Primary Examiner* — Ted Wang
(74) *Attorney, Agent, or Firm* — Dirk Brinkman; Gene Vinokur (57) ABSTRACT

A set of data symbols is selected from a set of modulation constellation, and a sample-mean of the set of data symbols is determined. Each data symbol is first shifted by the sample-mean to obtain a shifted data symbol, and then the shifted symbol is multiplied by a first constant to obtain a scaled data symbol. A second constant is added to the scaled data symbol to obtain a mapped data symbol. The sample-mean is multiplied by a third constant to obtain a sample-mean mapped symbol. The set of mapped data symbols and the sample-mean mapped symbol are then transmitted as a resource block.

13 Claims, 6 Drawing Sheets

$$m = \frac{1}{N-1}\sum_{k=1}^{N-1} D(k)$$

$$X(n) = \alpha_1(D(n)-m)+\beta \quad n=1,\ldots,N-1$$

$$X(N) = \alpha_2 m$$

METHOD FOR ENCODING DATA SYMBOLS WITH IMPLICITLY EMBEDDED PILOT SYMBOLS IN RESOURCE BLOCKS FOR WIRELESS NETWORKS

FIELD OF INVENTION

This invention relates generally to signal encoding in wireless communication networks, and more particularly to mapping data symbols selected from a set of modulation constellations onto data subcarriers with multiple transmitter antennas over multiple-input and multiple-output (MIMO) orthogonal frequency-division multiplexing (MIMO-OFDM) networks, and MIMO-OFDM-based relay-assisted cooperative communication networks.

BACKGROUND OF INVENTION

In wireless communication networks, orthogonal frequency division multiplexing (OFDM) and multiple-input and multiple-output (MIMO) transceivers can improve reliability for frequency-selective fading channels over wider transmission bandwidths, and also exploit frequency-selective scheduling gains in multi-user cellular (mobile) networks.

Without requiring additional bandwidth, MIMO techniques provide an enormous increase in data rates needed to support ever expanding high performance wireless networks. Furthermore, MIMO techniques with OFDM modulation provide high data rate capabilities over wider transmission bandwidths with improved reliability against time-frequency-selective channel fading, multi-user diversity and interference mitigation in cellular networks.

To estimate the MIMO-OFDM wireless channel in spatial, temporal and frequency domains, it is a common practice in the prior art to explicitly transmit known pilot symbols along with the unknown transmitted data symbols, which need to be detected by the receiver.

However, separate transmission of the pilot symbols wastes power, time and bandwidth (frequency) that could otherwise be used to increase the data rate. More importantly, a fixed number of the pilot symbols might not be sufficient to estimate a rapidly varying channel. It is also inefficient to estimate a channel that does not vary appreciably with a fixed number of pilot symbols.

In existing networks designed according to the IEEE 802.11n, IEEE 802.16e and 3GPP LTE standards, for example, which are based on MIMO and OFDM technologies, known pilot symbols and unknown modulated data symbols span distinct and predetermined time-frequency resource units. That is, the pilot symbols and the data symbols do not overlap. Because many different configurations are possible in placing pilot symbols and data symbols in a time-frequency resource block (RB), in a non-overlapping fashion, the consequence is that design and implementation of conventional RBs are less flexible.

As examples, in conventional networks, the RB design for MIMO-OFDM networks with spatial-multiplexing (SMUX) is different from the RB design for MIMO-OFDM networks with space-frequency or space-time coding, such as Alamouti coding, see U.S. Pat. No. 6,185,258, Alamouti, et al., Feb. 6, 2001, "Transmitter diversity technique for wireless communications."

In a similar manner, the conventional RB designs are extremely inflexible for some networks, such as multi-user MIMO-OFDM networks, MIMO-OFDM networks with multiple base-stations in cooperation (also referred to as coordinated multi-point transmission, CoMP), and cooperative communication networks that utilize multiple relay stations to increase reliability and enhance coverage.

SUMMARY OF THE INVENTION

The embodiments of the invention provide a method of encoding resource blocks for networks based on MIMO and OFDM techniques. The method implicitly embeds pilot symbols in data symbols in embedded resource blocks (ERBs). The implicit pilot symbols are embedded in the unknown modulated data symbols using a mapping function.

As a result, there is no need to allocate valuable resources, such as transmission time and bandwidth, to explicitly carry known pilot symbols as in the prior art. This leads to significant savings in time and bandwidth resources, thereby improving the overall network spectral efficiency.

Because all of the data symbols in our ERB design contain a portion of the implicit pilot symbols, the invention improves channel estimation accuracy, and thereby improves reliability and performance over channels with high variability and efficient resource utilization over channels with little variability.

The mapping function that we use to implicitly embed the pilot symbols in our ERB is based on an average energy of the transmitted data symbols. Although we do not explicitly transmit any pilot symbols, we can estimate the channel, and then recover the original data symbols.

We describe our ERB designs for the following scenarios:
ERBs for a single data stream;
ERBs for spatial multiplexing;
ERBs for two transmitter antennas with Alamouti coding;
ERBs for four transmitter antennas with stacked-Alamouti coding; and
ERBs designs for relay-assisted cooperative communication networks.

DETAILED DESCRIPTION OF THE PREFERRED EMBODIMENTS

Figure 1:
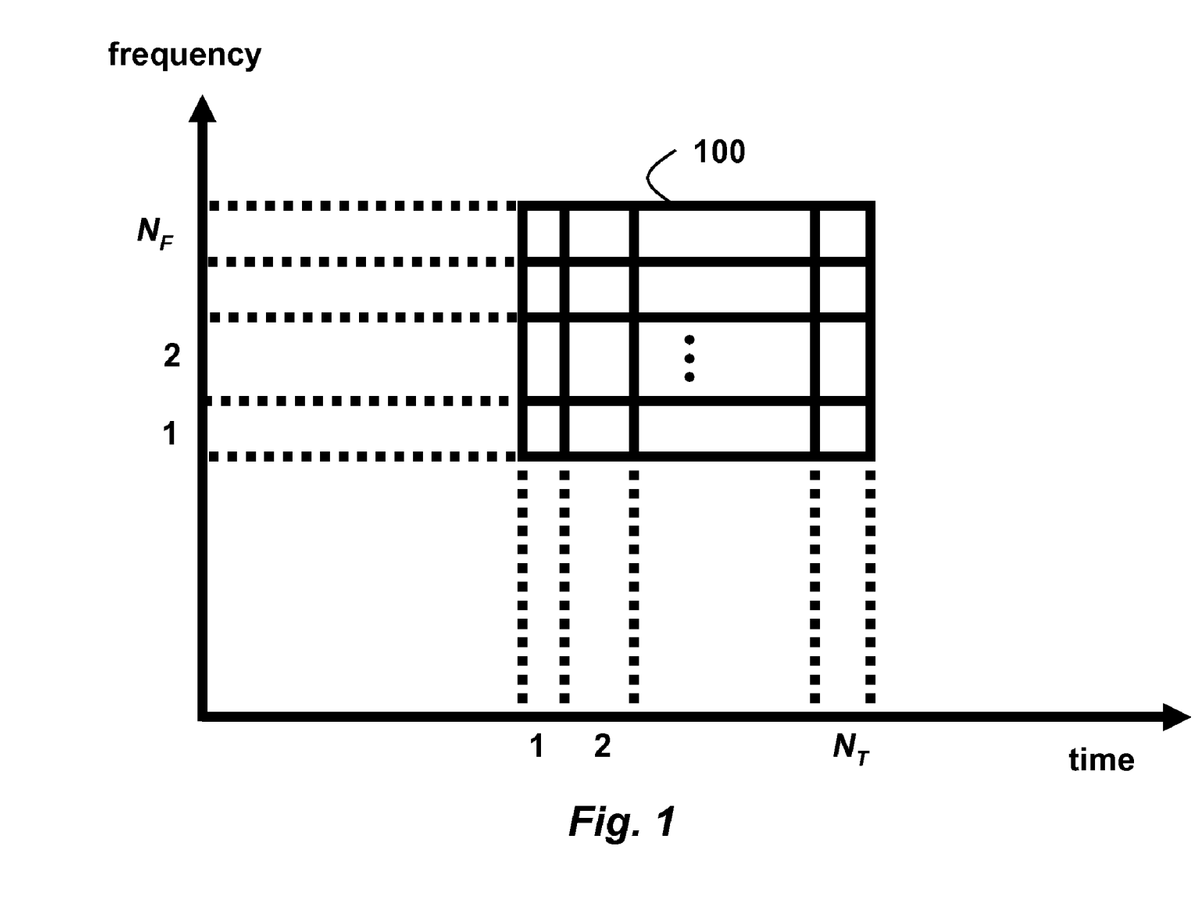
FIG. 1 is a block diagram of an embedded resource block (ERB) according to embodiments of the invention.

FIG. 1 shows an embedded resource block (ERB) 100 according to embodiments of our invention. In a two-dimensional time-frequency plane, the ERB is described by time-frequency resource units spanned by $N_T$ consecutive data symbols over $N_F$ consecutive frequency (or sub-carrier or sub-channel) tones. Each symbol is selected from a set of modulation constellations and represents data to be transmitted. It is noted that different symbols can be selected from different constellations. Thus, effectively, the symbols can be selected from a set of one or more of modulation constellations.

In wireless communications with orthogonal frequency-division multiplexing (OFDM) modulation, the channel coherence time is defined as the number of consecutive OFDM symbols during which the channel remains constant. The channel coherence bandwidth is defined as the number of consecutive subcarriers over which the channel remains constant.

The channel coherence (c) in the time-domain (T), in terms of the number of OFDM symbols, is approximately given by $$N_{c,T} = \text{round}\left(\frac{1}{f_d T_s}\sqrt{\frac{9}{16\pi}}\right)$$

where the function round(x) determines a nearest integer to x, $f_d$ is the Doppler spread and $T_s$ is the OFDM symbol duration.

In a similar manner, the channel coherence in the frequency-domain (F), in terms of the number of subcarriers, is approximately given by $$N_{c,F} = \text{round}\left(\frac{1}{5\sigma_{RMS}\Delta_f}\right)$$

where $\sigma_{RMS}$ is the root-mean-square (RMS) channel delay-spread and $\Delta_f$ is the sub-carrier spacing. When $N_T$ is selected to be less than the channel coherence time $N_T$ and $N_F$ is selected to be less than the channel coherence bandwidth $N_{c,F}$, the wireless channel is approximated to remain constant over the resource block 100 of size $N_T$-by-$N_F$ resource units.

Modulation constellations used in MIMO-OFDM based networks designed according to the IEEE 802.16e, IEEE 802.11n and 3GPP LTE standards include quadrature phase shift keying (QPSK), 16-quadrature amplitude modulation (QAM), 64-QAM, M-ary phase shift keying, and M-ary two-dimensional modulations We can select any of these.

Embedded Resource Blocks for Single Data Stream

Figure 2A:
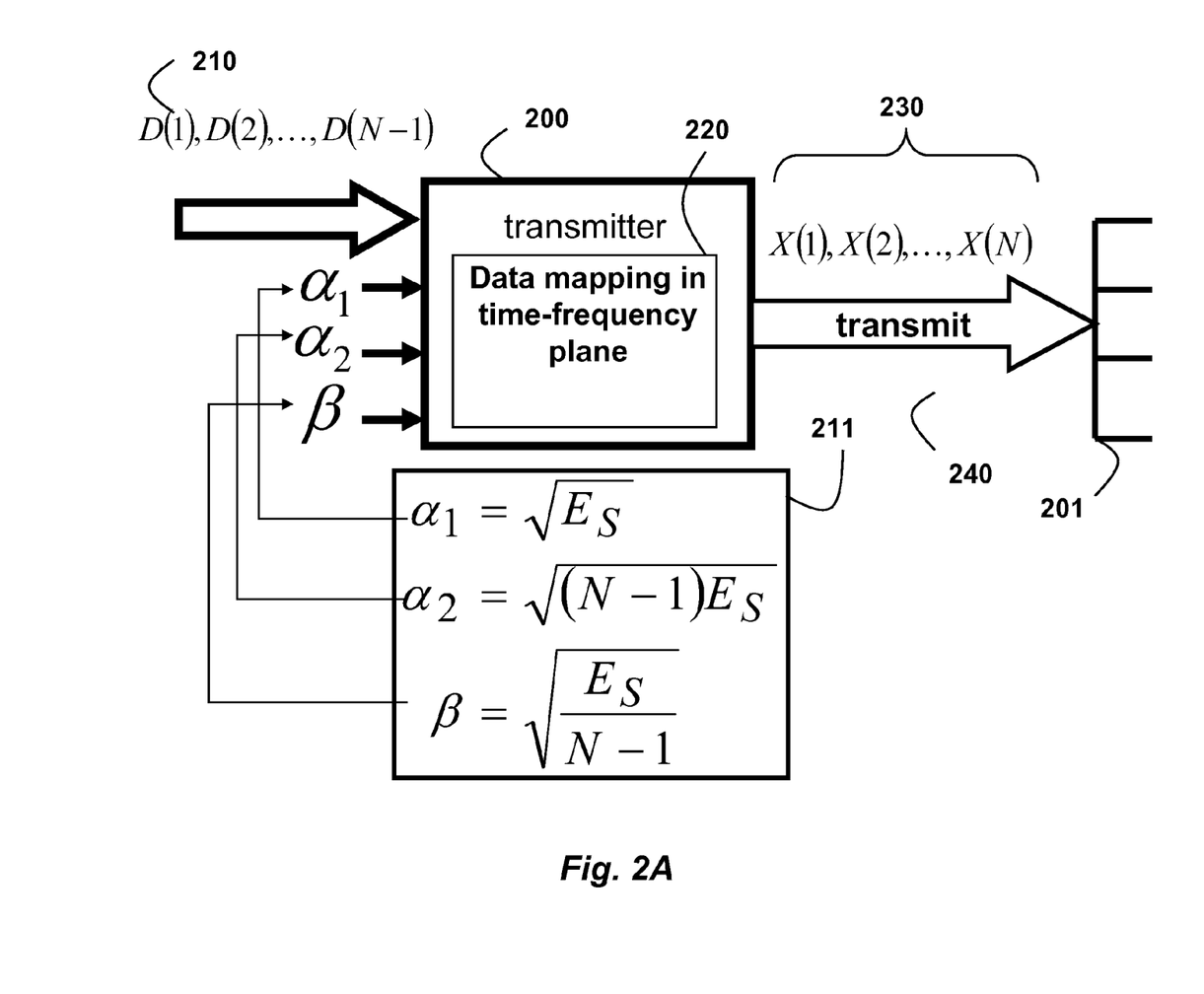
FIG. 2A is a block diagram of encoding an ERB for a single data stream in a transmitter according to embodiments of the invention.

As shown in FIG. 2A, a set of data symbols 210 of length N−1 is provided to a transmitter 200 with a set of one or more antennas 201. The symbols are selected from a set of modulation constellations and represent data to be transmitted. The data symbols are denoted by D(1), D(2), . . . , D(N−1). Each of D(i), i=1, . . . , N−1, is selected from the set of constellations. The data symbols are mapped 220 over N=$N_T$×$N_F$ resources of the resource block 100 as mapped data symbols X(1), X(2), . . . , X(N−1) 230 to be transmitted over a channel. A sample-mean mapped symbol X(N), described below, is also transmitted.

Step 1: Providing as input the N−1 data symbols D(1), D(2), . . . , D(N−1) 210, wherein the data symbols are selected from a set of (one or more) modulation constellations and represent data to be transmitted. Providing first, second and third constants, that is a set of positive constants $\alpha_1$, $\alpha_2$ and $\beta$ 211. The constants are dependent on corresponding first, second and third functions of the energy. Example functions, such as the mean, average and peak energies are described below.

A sample means m of the set of data symbols is determined.

Step 2: Perform the mapping 220 to the ERB 100 according to $$m = \frac{1}{N-1}\sum_{k=1}^{N-1} D(k)$$

$$X(n) = \alpha_1(D(n) - m) + \beta$$

$$n = 1, \ldots, N-1$$

$$X(N) = \alpha_2 m$$

Step 3: Transmitting 240 the mapped data symbols X(1), X(2), . . . , X(N−1) and the sample-mean mapped symbol X(N) 230 as a resource block over the channel using resource units spanned by $N_T$ consecutive symbols over $N_F$ consecutive frequency tones.

In the above mapping function 230, m is a sample-mean of the N−1 data symbols D(1), D(2), . . . , D(N−1), n is an index onto the available time-frequency resource units for transmission, and k is a dummy variable.

If $E_S$ is an average energy of each of the N−1 transmitted mapped data symbols, then the constants $\alpha_1$, $\alpha_2$ and $\beta$ 211 are respectively selected according to the following functions as $$\alpha_1 = \sqrt{E_S}$$

$$\alpha_2 = \sqrt{(N-1)E_S}$$

$$\beta = \sqrt{\frac{E_S}{N-1}}.$$

Thus, we can ensure that each of the data symbols X(1), X(2), . . . , X(N−1) 230 is transmitted, for example, with an average energy of $E_S$.

Figure 2B:
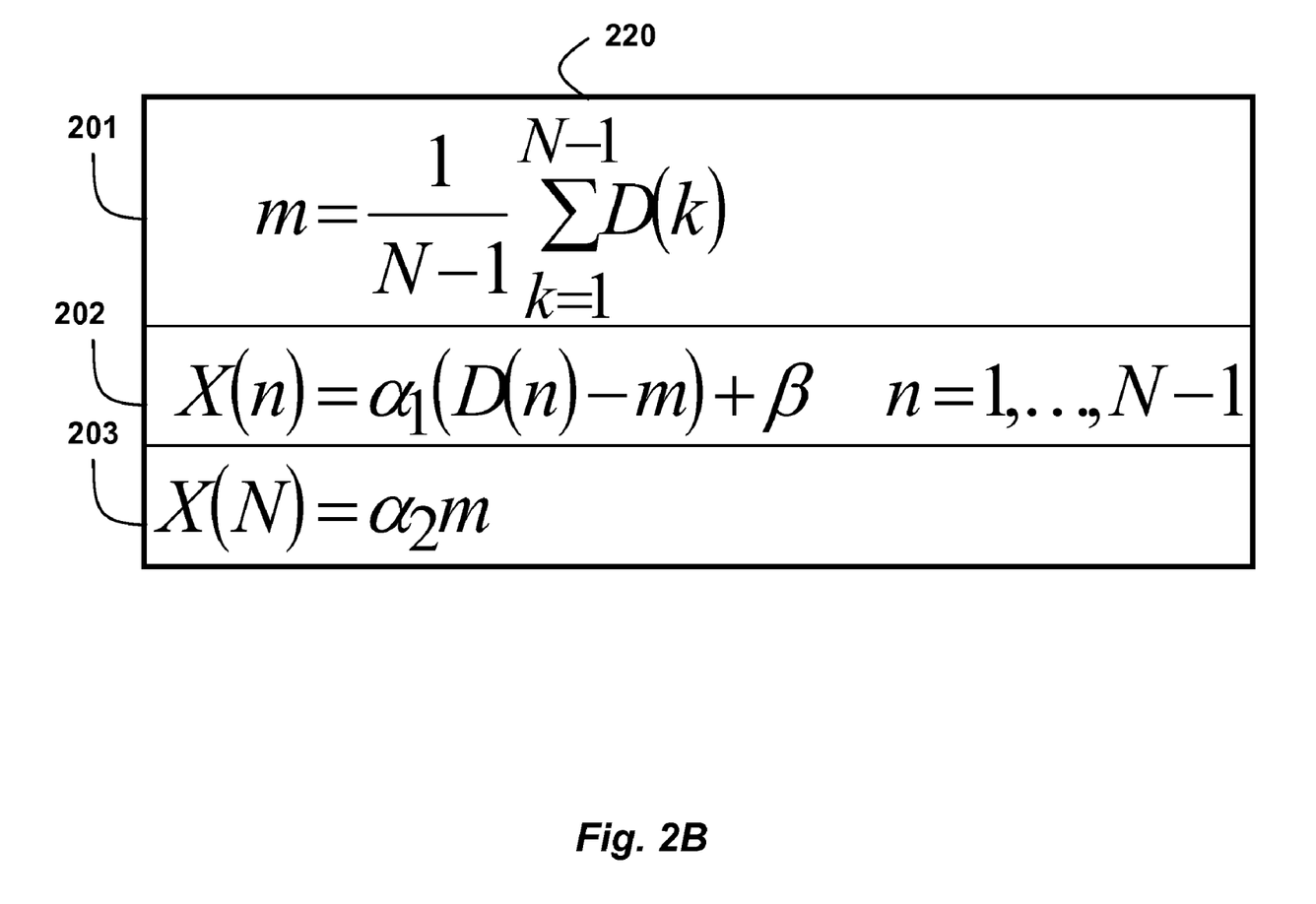
FIG. 2B is a block diagram of a mapping function according to embodiments of the invention.

As shown in FIG. 2B, the mapping function 220 of our method can be described as follows:
(step 221) we determine the sample-mean m of the set of N−1 data symbols;
(step 222) each of the N−1 data symbols is shifted by the sample mean m, and N−1 scaled data symbols are formed by multiplying the shifted data symbols in the second step by the first constant $\alpha_1$, and then offsetting by the second constant $\beta$; and
(step 223) the sample-mean is multiplied by the third constant $\alpha_2$ to obtain a sample-mean mapped symbol. The mapped data symbols and the sample-mean mapped symbol can than be transmitted over the time-frequency resource units X(1), X(2), . . . , X(N).

Although we do not explicitly transmit any pilot symbols with our method, each of the N−1 scaled symbols implicitly includes a pilot symbol to enable us to estimate the channel. The sample-mean symbol $\alpha_2$ m enables us to recover the original N−1 data symbols. We make these operations clear in our description of channel estimation and data detection at the receiver as described below.

The mapped symbols X(1), X(2), . . . , X(N−1) and the sample-mean mapped symbol at the output of the ERB mapping unit, are transmitted 330 over the resource block 100 using $N_F$ sub-carrier tones and $N_T$ OFDM symbols.

We do not explicitly transmit known pilot symbols within the ERB as in the prior art. Instead the pilot symbols are implicitly encoded in each data symbol in the resource block. As a result, the spectral efficiency achieved by this ERB mapping rule is very high. Because we use N resource units to transmit N−1 data symbols, the spectral efficiency of the resource block is (N−1)/N.

For example, when $N_T=3$ OFDM symbols and $N_F=6$ frequency tones, we have $N=N_T*N_F=3*6=18$ resource units, and the spectral efficiency is 17/18=94.5%. With $N_T=1$, our ERB mapping rule is applicable for sub-carriers within a single OFDM symbol, whereas when $N_F=1$, our ERB mapping rule is applicable for OFDM symbols on a given sub-carrier tone. More importantly, when $N_F=1$, our ERB mapping rule is also applicable for non-OFDM networks (such as single-carrier modulation networks).

Channel Estimation and Data Demodulation for ERB with Single Data Stream

For a single data stream and $M_R$ receiver-antenna OFDM network utilizing the above described mapping, we now describe a method to estimate the channel and recover the original symbols $D(1), D(2), \ldots, D(N-1)$. Our ERB mapping rule enables channel estimation without transmitting any pilot symbols. That is, the channel is estimated from the implicit pilot tones.

The received signal on the $n^{th}$ time-frequency resource unit with $N_T$ OFDM symbols and $N_F$ sub-carriers per OFDM symbol is given by $$Y_l(n) = H_l X(n) + Z_l(n),$$

where $l=1, \ldots, M_R$, and $n=1, \ldots, N_T N_F$.

Upon stacking the elements $Y_l(n), l=1, \ldots, M_R$, into one vector $$Y(n) = [Y_1(n) \ldots Y_{M_R}(n)]^T,$$

and similarly $$h = [H_1 \ldots H_{M_R}]^T,$$

we can write $$Y(n) = hX(n) + Z(n)$$

where $$Z(n) = [Z_1(n) \ldots Z_{M_R}(n)]^T \quad (1)$$

is the vector-valued noise-plus-interference vector.

From Equation (1), making use of an inverse of our mapping rule, an estimate of the channel $\hat{h}$ can be obtained as $$\hat{h} = \frac{1}{\beta(N-1)} \sum_{n=1}^{N-1} Y(n)$$

$$= \frac{1}{\beta(N-1)} \sum_{n=1}^{N-1} [h\{\alpha_1(D(n)-m)+\beta\} + Z(n)]$$

$$= h \frac{1}{\beta(N-1)} \sum_{n=1}^{N-1} [\alpha_1(D(n)-m)+\beta] + \frac{1}{\beta(N-1)} \sum_{n=1}^{N-1} Z(n)$$

$$= h + \frac{1}{\beta(N-1)} \sum_{n=1}^{N-1} Z(n).$$

Each of the first mapped N−1 symbols $X(1), \ldots, X(N-1)$ according to our ERB mapping rule is a sample-mean-shifted version of that data symbols $D(1), D(2), \ldots, D(N-1)$ scaled by the first constant $\alpha_1$ and offset by the second constant $\beta$. Because of this property, the sample-mean m of the first N−1 received symbols, transmitted as the sample-mean mapped symbol, i.e., an embedded pilot symbol, enables us to estimate the channel. Note that the effective noise random variable $$\sum_{n=1}^{N-1} Z(n)$$

is scaled by $\beta(N-1)$. That is, by increasing either the second constant $\beta$, or the number of data symbols N−1, or both, we can reduce the variance of this noise, thereby improving the accuracy of the channel estimate $\hat{h}$.

Using the above channel estimate, the symbols $D(1), D(2), \ldots, D(N-1)$ can be estimated as $$\hat{D}(n) = \frac{1}{\alpha_1}\left(\frac{\hat{h}^H Y(n)}{\hat{h}^H \hat{h}} - \beta\right) + \frac{1}{\alpha_2} \frac{\hat{h}^H Y(N)}{\hat{h}^H \hat{h}},$$

where $n=1, \ldots, N-1$, and "^" indicates an estimate.

It should be noted that the above estimates $\hat{D}(n)$ are also referred to as "soft" estimates of the modulation symbols $D(n)$. The above estimates are valid for arbitrary constellations to which the data symbols $D(n)$ belongs. Using well-known techniques available in the prior art, it is easy to generate log-likelihood ratio (LLR) information for each bit encoded in the modulation symbols $D(n)$, and a hard-decision demodulation version of the estimates $\hat{D}(n)$.

We also note that the above described ERB mapping rule is devised when all the N modulation symbols at the output of the ERB transmit at the same level of average energy per symbol. It is also possible to modify the previous ERB mapping rule, in a non-trivial fashion, to allow for unequal average transmission energy per symbol. We describe these modifications below.

The average energy at which the symbol $X(n)$ is transmitted is $E_S(n)$. Then, upon defining the following 2N−1 constants $$\alpha_1(k) = \sqrt{E_S(k)}$$

$$k = 1, \ldots, N-1$$

$$\beta(k) = \sqrt{\frac{E_S(k)}{N-1}}$$

$$k = 1, \ldots, N-1$$

$$\alpha_2 = \sqrt{(N-1)E_S(N)},$$

we perform the mapping from $D(1), D(2), \ldots, D(N-1)$ to $X(1), X(2), \ldots, X(N)$ as $$m = \frac{1}{N-1} \sum_{k=1}^{N-1} D(k)$$

$$X(n) = \alpha_1(n)(D(n)-m) + \beta(n)$$

$$n = 1, \ldots, N-1$$

$$X(N) = \alpha_2 m$$

Note that the only difference between this ERB mapping rule and the previously described ERB mapping rule is that instead of having the three constants $\alpha_1, \alpha_2$ and $\beta$, we now have a set of 2N−1 first constants $\{\alpha_1(1), \ldots, \alpha_1(N-1)\}, \alpha_2$ and a set of second constants $\{\beta(1), \ldots, \beta(N-1)\}$. Using the previous received signal model, described in equation (1), the channel is estimated as $$\hat{h} = \frac{\sum_{n=1}^{N-1} \frac{Y(n)}{\alpha_1(n)}}{\sum_{n=1}^{N-1} \frac{\beta(n)}{\alpha_1(n)}}$$

$$= \frac{\sum_{n=1}^{N-1} \frac{[h\{\alpha_1(n)(D(n)-m)+\beta(n)\}+Z(n)]}{\alpha_1(n)}}{\sum_{n=1}^{N-1} \frac{\beta(n)}{\alpha_1(n)}}$$

$$= h + \frac{\sum_{n=1}^{N-1} \frac{[Z(n)]}{\alpha_1(n)}}{\sum_{n=1}^{N-1} \frac{\beta(n)}{\alpha_1(n)}}.$$

Using the above estimated channel, the symbols D(1), D(2), . . . , D(N−1) can be estimated as $$\hat{D}(n) = \frac{1}{\alpha_1(n)}\left(\frac{\hat{h}^H Y(n)}{\hat{h}^H \hat{h}} - \beta(n)\right) + \frac{1}{\alpha_2}\frac{\hat{h}^H Y(N)}{\hat{h}^H \hat{h}},$$

where n=1, . . . , N−1.

Embedded Resource Blocks for Spatial Multiplexing

The ERB mapping rule for the single-stream SIMO-OFDM networks can be extended to a transmitter with multiple transmitter antennas and multiple data streams.

We describe an encoding rule for a MIMO-OFDM network with K transmitter antennas. The number of streams can be smaller than the number of transmitter antennas. For simplicity, we assume that the number of streams is equal to the number of transmitter antennas.

The desired number of symbols for MIMO-OFDM mapping is partitioned into K streams, each stream with N symbols. We employ $N_T$ OFDM symbols and $N_F$ sub-carriers per OFDM symbol such that the number of channel uses is $N_T * N_F = N+K$. The symbol on $n^{th}$ time-frequency resource (or channel use n) on transmitter antenna k is denoted by $D_k(n)$.

Figure 3:
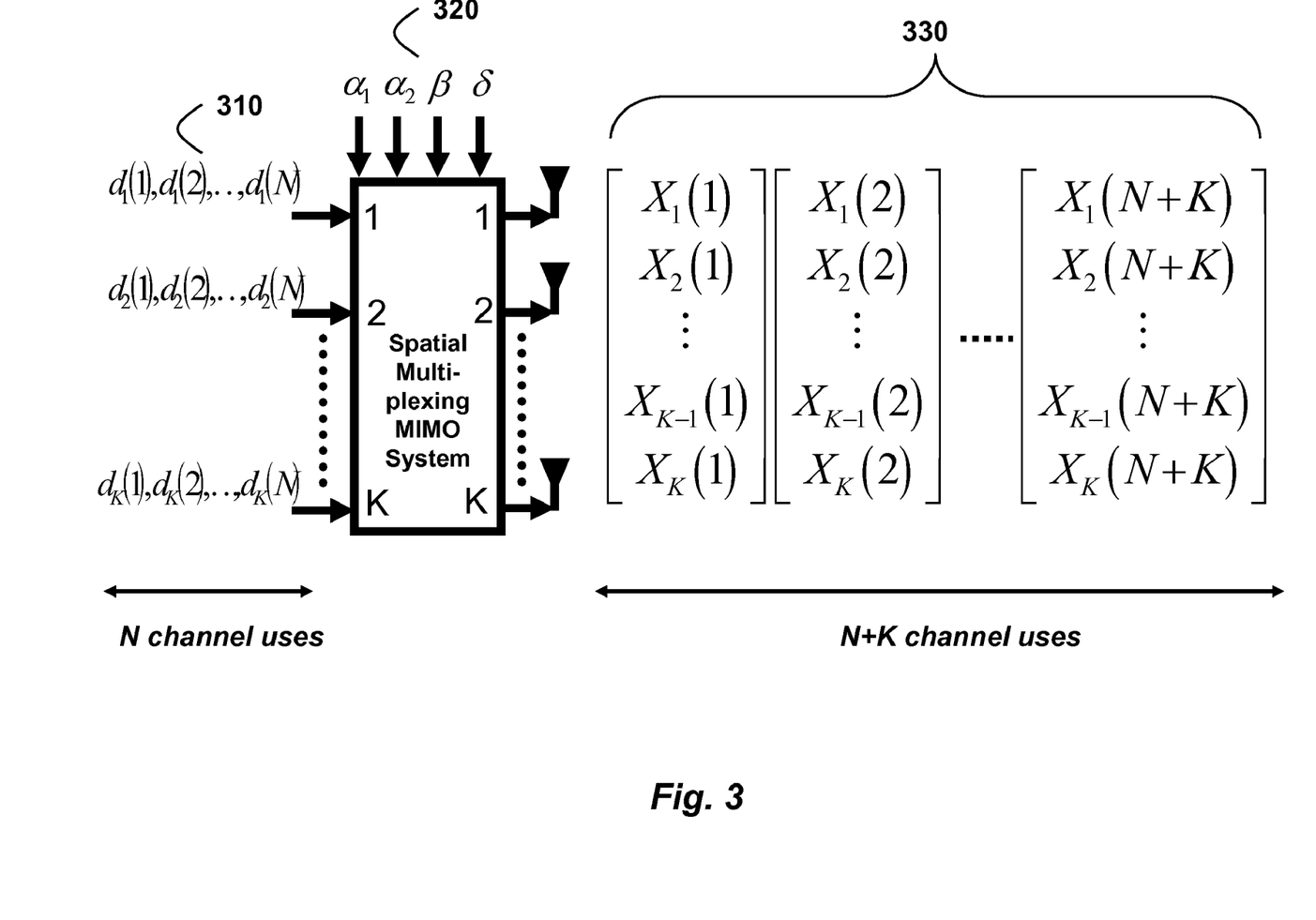
FIG. 3 is a block diagram of encoding an ERB for spatial multiplexing according to embodiments of the invention.

FIG. 3 shows the ERB mapping rule for MIMO-OFDM with spatial-multiplexing.

Step 1: As before, a set of data symbols is provided as input. The number of symbols N is selected such that N is divisible by the number of streams, K. The N*K symbols are rearranged as $D_1(1), D_1(2), \ldots, D_1(N), \ldots, D_K(1), D_K(2), \ldots, D_K(N)$ 310. Here, $D_k(1), D_k(2), \ldots, D_k(N)$ are the symbols corresponding to transmitter antenna k. The mapping unit 320 is also provided with the positive constants $\alpha_1, \alpha_2, \beta$, as well as a fourth constant $\delta$. The fourth constant depends on a fourth function of the energy.

As an example, the constants $\alpha_1, \alpha_2, \beta$ and $\delta$ can be selected as follows. With $E_S$ denoting the average energy per transmitted symbol per transmitter antenna, by selecting $$\alpha_1 = \sqrt{E_S}$$

$$\alpha_2 = \sqrt{\left(\frac{N-K}{N}\right)E_S}$$

-continued $$\beta = \sqrt{\frac{E_S K}{N}}$$

$$\delta = \sqrt{\frac{E_S N}{K}}$$

we can ensure that each of N+K modulation symbols on each of the K transmitter antennas are transmitted with an average energy of $E_S$.

Step 2:

For l = 1 to K
For t = 1 to K $$m_{t,l} = \frac{K}{N} \sum_{j=(l-1)\frac{N}{K}+1}^{l\frac{N}{K}} D_t(j)$$

End
For n = (l−1)(N/K)+1 to l(N/K)
 For t = 1 to K
  If t == 1
   $X_t(n) = \alpha_1(D_t(n) - m_{t,l}) + \beta$,
  Else
   $X_t(n) = \alpha_2(D_t(n) - m_{t,l})$,
  End
 End
End
For t = 1 to K
 $X_t(N + l) = \delta m_{t,l}$
End
End Step 3: At channel use n, n=1, . . . , N+K, transmit 330 $X_1$(n) from transmitter antenna 1, $X_2$ (n) from transmitter antenna 2, and so on $X_K$ (n) from transmitter antenna K Note that the total number of time-frequency resource units on which the ERB mapped symbols are transmitted is equal to $K+N=N_T N_F$. That is, the spectral efficiency of the ERB mapping rule is KN/(K+N), and the per-stream efficiency is N/(N+K). For example, when $N_T=3$ OFDM symbols and $N_F=6$ frequency tones, we have $N=N_T*N_F=3*6=18$ resource units.

With K=2 streams, the spectral efficiency is 2*16/18=1.7778, whereas the per-stream efficiency is 16/18=88.9%. With $N_T=1$, our SMUX ERB mapping rule is applicable for sub-carriers within a single OFDM symbol, whereas when $N_F=1$, our SMUX ERB mapping rule is applicable for OFDM symbols on a given sub-carrier tone.

Channel Estimation and Data Demodulation for ERB with Spatial Multiplexing

We describe channel estimation and data demodulation with the above mapping rule for K transmitter antennas. We select the parameters $N_F$, $N_T$ and K such that the channel remains constant over $N_T*N_F=N+K$ channel uses. With this, the vector-valued received signal is given as follows $$Y(n) = \sum_{t=1}^{K} h_t X_t(n) + w(n)$$

$$n = 1, \ldots, N + K.$$

An estimate of the channel from each transmit antenna to the received antenna array is $$\hat{h}_t = \frac{K}{N\beta} \sum_{n=(t-1)\frac{N}{K}+1}^{t\frac{N}{K}} Y(n) = h_t + \frac{K}{N\beta} \sum_{n=(t-1)\frac{N}{K}+1}^{t\frac{N}{K}} w(n).$$

In the above, t=1 to K.

We define an $M_R$-by-K matrix G such that $$G = [\hat{h}_1 \hat{h}_2 \ldots \hat{h}_K].$$

Then, the data detection proceeds in two steps. In the first step, we detect the intermediate variables $m_{1,1}, m_{K,1}, \ldots, M_{K,K}$, as $$\begin{bmatrix} \hat{m}_{1,n} \\ \hat{m}_{2,n} \\ \vdots \\ \hat{m}_{K,n} \end{bmatrix} = \begin{bmatrix} \delta^{-1} & 0 & \ldots & 0 \\ 0 & \delta^{-1} & \ldots & 0 \\ \vdots & \ddots & \ddots & \vdots \\ 0 & \ldots & 0 & \delta^{-1} \end{bmatrix} (G^H G + \hat{\sigma}^2 I_K)^{-1} G^H Y(N+n)$$

$$n = 1, 2, \ldots, K$$

Using the above estimates of $m_{1,1}, m_{K,1}, \ldots, M_{K,K}$, the symbols prior to the mapping, $D_1(1), D_1(2), \ldots, D_1(N), \ldots, D_K(1), D_K(2), \ldots, D_K(N)$, can be detected as For l=1 to K For n=(l−1)(N/K)+1 to l(N/K)

For t=1 to K

Estimate the mapped symbol on transmit antenna t $$\hat{X}_t(n) = [(G^H G + \hat{\sigma}^2 I_K)^{-1} G^H Y(n)]_t.$$

If $t == l$ $\qquad \hat{D}_t(n) = \frac{1}{\alpha_1}(\hat{X}_t(n) - \beta) + \hat{m}_{t,l}$ Else $$\hat{D}_t(n) = \frac{\hat{X}_t(n)}{\alpha_2} + \hat{m}_{t,l}$$

End

End

End

End

Embedded Resource Blocks for Alamouti Transmission

Alamouti block coding is a widely used transmitter diversity techniques for data transmission with two transmitter antennas. In the conventional Alamouti coding, without our ERB mapping rule, two modulations symbols $S_1$ and $S_2$ at two consecutive channel uses are transmitted from the two transmitter antennas as follows.

During the first channel use, transmitter antenna 1 sends $S_1$ and antenna 2 transmits $S_2$. During the second channel use, antenna 1 transmits $-S_2$ and transmitter antenna 2 transmits $S_1$, where * denotes the complex conjugate. The two symbols over the two channel uses with two transmitter antennas are expressed in the matrix form as $$\begin{bmatrix} S_1 & -S_2^* \\ S_2 & S_1^* \end{bmatrix}.$$

In the above matrix, the columns represent the channel uses, and the rows represent the transmitter antennas. If the channel use in frequency domain, for example two consecutive sub-carrier tones of an OFDM symbol, then the above Alamouti coding is referred to as space-frequency block code (SFBC). If the channel use is in time domain, for example a given frequency tone across two consecutive OFDM symbols, then the above Alamouti coding is referred to as space-time block code (STBC).

The above matrix is orthogonal. As a result, if the channel does not change appreciably over the two channel uses, then the receiver extracts full-diversity with a simple linear receiver such as maximal ratio combining (MRC) receiver.

The conventional Alamouti coding requires explicit transmission of known pilot symbols from the transmitter so that the receiver can estimate the MIMO channel prior to data detection.

Figure 4:
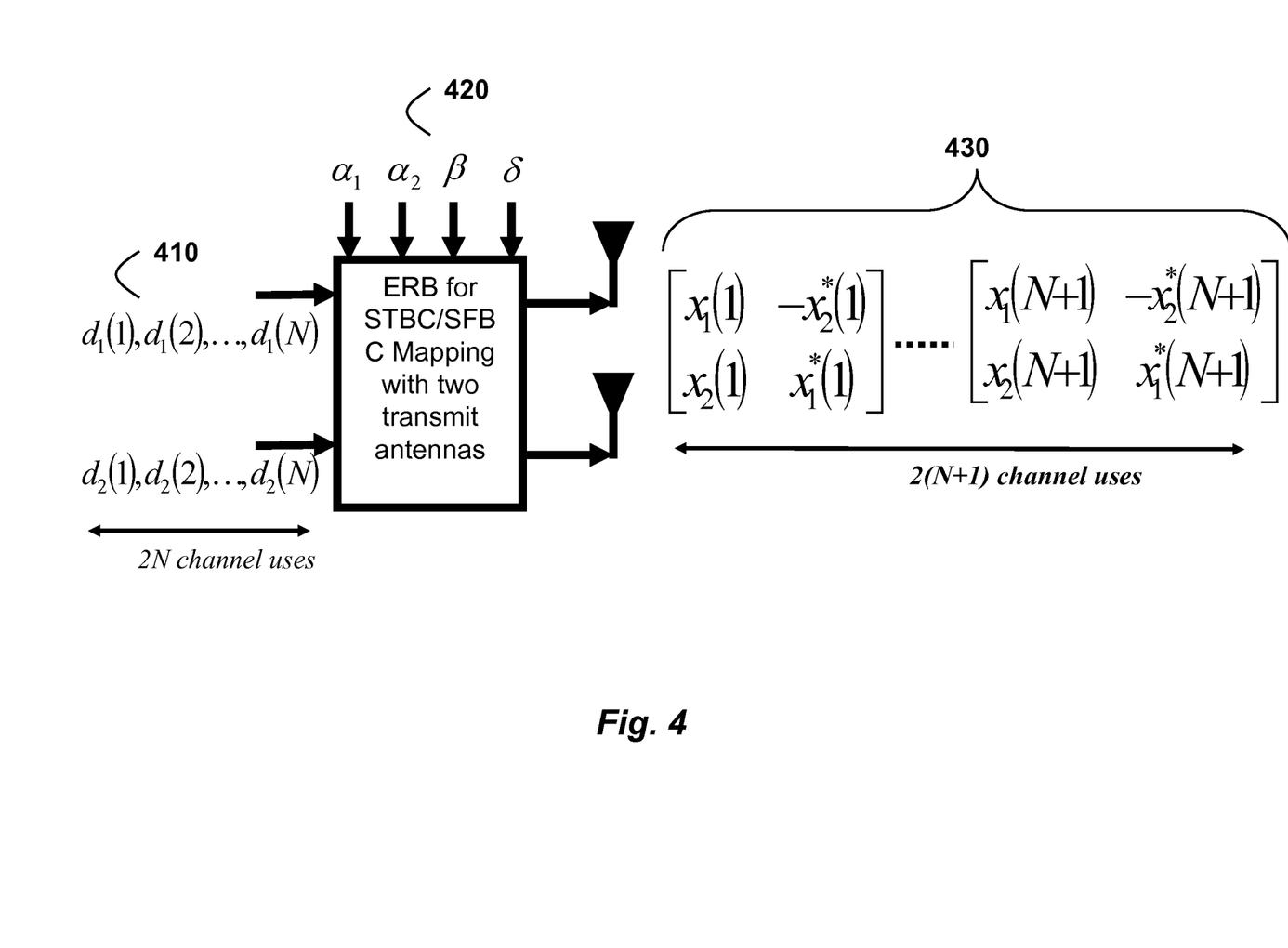
FIG. 4 is a block diagram of encoding an ERB for two transmitter antennas with Alamouti coding stream according to embodiments of the invention.

As shown in FIG. 4, we provide an ERB mapping rule for an OFDM network with two transmitter antennas and $M_R$ receiver antennas with Alamouti encoding and implicit pilot symbols. Our mapping rule is equally applicable to both STBC and SFBC versions of the Alamouti coding. The mapping rule takes 2N symbols to transmit over $N_T*N_F=2N+2$ channel uses. A conceptual diagram of the mapping unit is shown in FIG. 4.

Step 1: The 2N symbols $D_1(1), D_1(2), \ldots, D_1(N)$ 410 are inputted to the first transmitter antenna, whereas $D_2(1), D_2(2), \ldots, D_2(N)$ are inputted to the second transmitter antenna. The mapping unit 420 is provided with our four constants $\alpha_1, \alpha_2, \beta$, and $\delta$.

As an example, the constants $\alpha_1, \alpha_2, \beta$ and $\delta$ can be selected as follows. With $E_S$ denoting the average energy per transmitted symbol per each of the two transmitter antennas, by selecting $$\alpha_1 = \sqrt{E_S\left(\frac{N}{N-1}\right)}$$

$$\alpha_2 = \sqrt{E_S}$$

$$\beta = \sqrt{\frac{E_S}{N}}$$

$$\delta = \sqrt{E_S N},$$

we can ensure that each modulation symbol on each of the two transmitter antennas is transmitted with an average energy of $E_S$.

Step 2: The mapping unit performs the following operations $$m_1 = \frac{1}{N}\sum_{k=1}^{N} D_1(k)$$

$$m_2 = \frac{1}{N}\sum_{k=1}^{N} D_2(k)$$

$$X_1(n) = \alpha_1(D_1(n) - m_1) n = 1, \ldots, N$$

$$X_1(N+1) = \delta m_1$$

-continued $$X_2(n) = \alpha_2(D_2(n) - m_2) + \beta \ n = 1, \ldots, N$$

$$X_2(N+1) = \delta m_2$$

to obtain the sequence $X_1(1), X_1(2), \ldots, X_1(N+1)$ and $X_2(1), X_2(2), \ldots, X_2(N+1)$ Step 3: At channel use $2k-1$, $k=1, \ldots, N+1$, the transmitter transmits 430 $X_1(k)$ from transmitter antenna 1 whereas $X_2(k)$ from transmitter antenna 2. At channel use $2k$, $k=1, \ldots, N+1$, the transmitter transmits $-X_2^*(k)$ from transmitter antenna 1 whereas $X_1^*(k)$ from transmitter antenna 2

Channel Estimation and Data Demodulation for ERB with STBC/STBC Coding

Note that the total number of time-frequency resource units on which the ERB mapped symbols are transmitted with Alamouti coding is equal to $2N+2=N_T N_F$. That is, the spectral efficiency of our ERB mapping rule is $2N/(2N+2)=N/(N+1)$ and the per-stream efficiency is also equal to $N/(N+1)$.

For example, when $N_T=3$ OFDM symbols and $N_F=6$ frequency tones, we have $2N+2=N_T*N_F=3*6=18$ resource units. With this, the spectral efficiency is $2*8/18=88.9\%$, which is also equal to the per-stream efficiency. With $N_T=1$, our ERB mapping rule is applicable for SFBC transmission within a single OFDM symbol, whereas when $N_F=1$, our ERB mapping rule is applicable for STBC transmission on a given sub-carrier tone.

We now describe a way to channel estimation and data demodulation with the above described mapping rule with two transmitter antennas. Assuming that the channel remains constant over $N_T N_F=2N+2$ channel uses, the vector-valued received signal is given as follows $$Y(2n-1) = h_1 X_1(n) + h_2 X_2(n) + w(2n-1) \ n=1, \ldots, N$$

$$Y(2n) = -h_1 X_2^*(n) + h_2 X_1^*(n) + w(2n) \ n=1, \ldots, N$$

$$Y(2N+1) = h_1 \delta m_1 + h_2 \delta m_2 + w(2N+1)$$

$$Y(2N+2) = -h_1 \delta m_2^* + h_2 \delta m_1^* + w(2N+2)$$

In the above, $h_1$ and $h_2$ are the $M_R$-by-1 channel gains from the first and the second transmit antennas to each of the $M_R$ receiver antennas. All the other bold-faced variables in the above equations are also vectors of length $M_R$-by-1.

Upon exploiting our mapping rule described above, estimates of the channels $h_1$ and $h_2$ can be obtained as $$\hat{h}_1 = \frac{1}{N\beta} \sum_{n=1}^{N} Y(2n) = h_1 - \frac{1}{N\beta} \sum_{n=1}^{N} w(2n), \text{ and}$$

$$\hat{h}_2 = \frac{1}{N\beta} \sum_{n=1}^{N} Y(2n-1) = h_2 + \frac{1}{N\beta} \sum_{n=1}^{N} w(2n-1).$$

Estimated of intermediate variables $m_1$ and $m_2$ can be obtained as $$\hat{m}_1 = \frac{1}{\delta}\left(\frac{\hat{h}_1^H Y(2N+1) + \hat{h}_2^T Y^*(2N+2)}{\hat{h}_1^H \hat{h}_1 + \hat{h}_2^H \hat{h}_2}\right), \text{ and}$$

$$\hat{m}_2 = \frac{1}{\delta}\left(\frac{\hat{h}_2^H Y(2N+1) - \hat{h}_1^T Y^*(2N+2)}{\hat{h}_1^H \hat{h}_1 + \hat{h}_2^H \hat{h}_2}\right).$$

Using the above estimates of $m_1$ and $m_2$, we can detect the original symbols $D_1(1), D_1(2), \ldots, D_1(N)$ and $D_2(1), D_2(2), \ldots, D_2(N)$ as follows:

$$\hat{D}_1(n) = \hat{m}_1 + \frac{1}{\alpha_1}\left(\frac{\hat{h}_1^H Y(2n-1) + \hat{h}_2^T Y^*(2n)}{\hat{h}_1^H \hat{h}_1 + \hat{h}_2^H \hat{h}_2}\right) n = 1, \ldots, N, \text{ and}$$

$$\hat{D}_2(n) = \hat{m}_2 + \frac{1}{\alpha_2}\left(\frac{\hat{h}_2^H Y(2n-1) + \hat{h}_1^T Y^*(2n)}{\hat{h}_1^H \hat{h}_1 + \hat{h}_2^H \hat{h}_2} - \beta\right) n = 1, \ldots, N.$$

Embedded Resource Blocks for Stacked Alamouti Transmission

Similar to the ERB mapping rule described for OFDM networks with two transmitter antennas and Alamouti encoding, we provide the mapping rule for OFDM networks with four transmitter antennas and stacked-Alamouti coding.

First, we briefly describe the conventional stacked-Alamouti coding without ERB. With four symbols, $S_1, S_2, S_3$ and $S_4$, to be transmitted in two channel uses, the conventional stacked-Alamouti coding operation without ERB is described as follows.

For the first channel use, transmit $S_1$ from transmitter antenna 1, $S_2$ from transmitter antenna 2, $S_3$ from transmitter antenna 3, and $S_4$ from transmitter antenna 4. For the second channel use, transmit $-S_2^*$ from transmitter antenna 1, $S_1^*$ from transmitter antenna 2, $-S_4^*$ from transmitter antenna 3, and $S_3^*$ from transmitter antenna 4.

Note that the above procedure can also be described in a matrix form as $$\begin{bmatrix} S_1 & -S_2^* \\ S_2 & S_1^* \\ S_3 & -S_4^* \\ S_4 & S_3^* \end{bmatrix}.$$

It is important to point-out that the first 2-by-2 sub-matrix $$S_1 = \begin{bmatrix} S_1 & -S_2^* \\ S_2 & S_1^* \end{bmatrix}$$

is orthogonal. As a result, its entries $S_1$ and $S_2$ can be detected with a linear receiver to provide maximum possible diversity gain.

In a similar manner, the second 2-by-2 sub-matrix $$S_2 = \begin{bmatrix} S_3 & -S_4^* \\ S_4 & S_3^* \end{bmatrix}$$

is also orthogonal, and its entries $S_3$ and $S_4$ can also be detected with a linear receiver to provide maximum possible diversity gain. However, notice that the first sub-matrix $S_1$ and the second sub-matrix $S_2$ are not orthogonal to each other. As a result, we employ some form of interference cancellation (or mitigation) procedure to minimize the interference caused by $S_1$ upon $S_2$ and vice versa.

If the channel use in frequency domain, for example two consecutive sub-carrier tones of an OFDM symbol, then the above stacked-Alamouti coding is referred to as stacked-SFBC. If the channel use is in time domain (for example, a given frequency tone across two consecutive OFDM symbols) then the above Alamouti coding is referred to as stacked-STBC. It is important to point out that the above described stacked-SFBC and stacked-STBC coding require transmission of known pilot symbols from the transmitter so that the receiver can estimate the MIMO channel prior to data detection.

Figure 5:
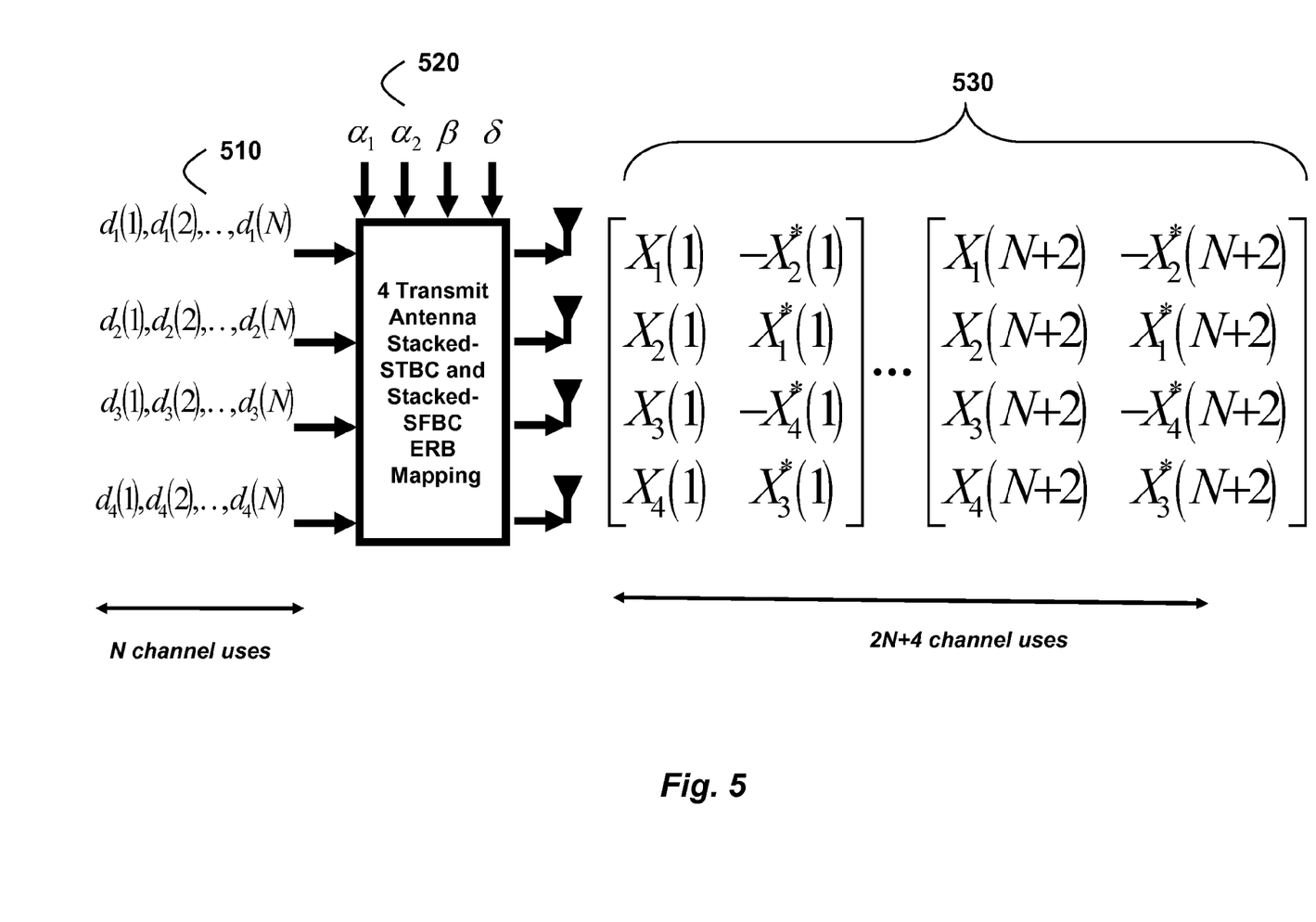
FIG. 5 is a block diagram of encoding an ERB for four transmitter antennas with stacked-Alamouti coding according to embodiments of the invention.

As shown in FIG. 5, we provide an ERB mapping rule for an OFDM network with four transmitter antennas and $M_R$ receiver antennas with stacked-STBC/SFBC encoding. The mapping rule takes 4N symbols to transmit over $N_T N_F = 2N+4$ channel uses.

Step 1: The number of symbols 510, N, is selected such that N is divisible by 2. The 4N symbols are rearranged in such a way that $D_1(1), D_1(2), \ldots, D_1(N)$ are inputted to the first transmitter antenna, $D_2(1), D_2(2), \ldots, D_2(N)$ are inputted to the second transmitter antenna, $D_3(1), D_3(2), \ldots, D_3(N)$ are inputted to the third transmitter antenna, and $D_4(1), D_4(2), \ldots, D_4(N)$ are inputted to the fourth transmitter antenna.

The ERB mapping unit 520 is provided with positive constants $\alpha_1, \alpha_2, \beta,$ and $\delta$ As an example, the constants $\alpha_1, \alpha_2, \beta$ and $\delta$ can be selected as follows. With $E_S$ denoting the average energy per transmitted symbol per each of the two transmitter antennas, by selecting $$\alpha_1 = \sqrt{E_S}$$

$$\alpha_2 = \sqrt{E_S\left(\frac{N}{N-2}\right)}$$

$$\beta = \sqrt{\frac{2E_S}{N}}$$

$$\delta = \sqrt{\frac{E_S N}{2}},$$

we can ensure that each modulation symbol on each of the two transmitter antennas with stacked STBC/SFBC scheme is transmitted with an average energy of $E_S$.

Step 2: For $l = 1$ to 2
    For $t = 1$ to 4

$$m_{t,l} = \frac{2}{N} \sum_{j=(l-1)\frac{N}{2}+1}^{l\frac{N}{2}} D_t(j)$$

End

For $n = (l-1)(N/2) + 1$ to $l(N/2)$
    If $l == 1$
        $X_1(n) = \alpha_1(D_1(n) - m_{1,l}) + \beta$
        $X_2(n) = \alpha_2(D_2(n) - m_{2,l})$
        $X_3(n) = \alpha_2(D_3(n) - m_{3,l})$
        $X_4(n) = \alpha_2(D_4(n) - m_{4,l})$
    Else
        $X_1(n) = \alpha_2(D_1(n) - m_{1,l})$
        $X_2(n) = \alpha_2(D_2(n) - m_{2,l})$
        $X_3(n) = \alpha_1(D_3(n) - m_{3,l}) + \beta$
        $X_4(n) = \alpha_2(D_4(n) - m_{4,l})$
    End
End
For $l = 1$ to 2
    $X_1(N + 2l - 1) = \delta m_{1,l}$
    $X_2(N + 2l - 1) = \delta m_{2,l}$
    $X_3(N + 2l - 1) = \delta m_{3,l}$
    $X_4(N + 2l - 1) = \delta m_{4,l}$
End End Step 3: At channel use $2n-1$, $n=1, 2, \ldots, N+2$, transmit 530 $X_1(n)$ from transmitter antenna 1, $X_2(n)$ from transmitter antenna 2, $X_3(n)$ from transmitter antenna 3, and $X_4(n)$ from transmitter antenna 4. At channel use $2n$, $n=1, 2, \ldots, N+2$, transmit $-X_2^*(n)$ from transmitter antenna 1, $X_1^*(n)$ from transmitter antenna 2, $-X_4^*(n)$ from transmitter antenna 3, and $X_3^*(n)$ from transmitter antenna 4.

Channel Estimation and Data Demodulation for ERB with Stacked-STBC/SFBC

The total number of time-frequency resource units on which the ERB mapped symbols are transmitted with stacked-STBC/SFBC is equal to $2N+4=N_T N_F$. That is, the spectral efficiency of the ERB mapping rule is $4N/(2N+4)=2N/(N+2)$ and the per-stream efficiency is equal to $N/(N+2)$.

For example, when $N_T=3$ OFDM symbols and $N_F=6$ frequency tones, we have $2N+4=N_T*N_F=3*6=18$ resource units. With this, the spectral efficiency is $4*7/18=1.56$, and the per-stream efficiency is equal to $7/9=77.8\%$. With $N_T=1$, our ERB mapping rule is applicable for stacked-SFBC transmission within a single OFDM symbol, whereas when $N_F=1$, our ERB mapping rule is applicable for stacked-STBC transmission on a given sub-carrier tone.

We now describe channel estimation and data demodulation with the above described ERB mapping rule for stacked-STBC/SFBC coding with four transmitter antennas.

Assuming that the channel remains constant over $N_T N_F=2N+4$ channel uses, the vector valued received signal is given as follows $Y(2n-1)=h_1 X_1(n)+h_2 X_2(n)+h_3 X_3(n)+h_4 X_4(n)+w(2n-1)$
$n=1,\ldots,N+2$ $Y(2n)=h_1 X_2^*(n)+h_2 X_1^*(n)-h_3 X_4^*(n)+h_4 X_3^*(n)+w(2n)$
$n=1,\ldots,N+2$.

In the above, $h_1$, $h_2$, $h_3$ and $h_4$ are the $M_R$-by-1 channel gains from the first, second, third and fourth transmit antennas to each of the $M_R$ receiver antennas, respectively. All the other bold-faced variables in the above equations are also vectors of length $M_R$-by-1.

Upon exploiting our ERB mapping rule described at the beginning of this section, estimates of the channels $h_1$, $h_2$, $h_3$ and $h_4$ can be obtained as $$\hat{h}_1 = \frac{2}{N\beta}\sum_{n=1}^{\frac{N}{2}} Y(2n-1) = h_1 + \frac{2}{N\beta}\sum_{n=1}^{\frac{N}{2}} w(2n-1)$$

$$\hat{h}_2 = \frac{2}{N\beta}\sum_{n=1}^{\frac{N}{2}} Y(2n) = h_2 + \frac{2}{N\beta}\sum_{n=1}^{\frac{N}{2}} w(2n)$$

$$\hat{h}_3 = \frac{2}{N\beta}\sum_{n=1}^{\frac{N}{2}} Y(N+2n-1) = h_3 + \frac{2}{N\beta}\sum_{n=1}^{\frac{N}{2}} w(N+2n-1)$$

$$\hat{h}_4 = \frac{2}{N\beta}\sum_{n=1}^{\frac{N}{2}} Y(N+2n) = h_4 + \frac{2}{N\beta}\sum_{n=1}^{\frac{N}{2}} w(N+2n).$$

Using the above channel estimates, we define a matrix G such that $$G = \begin{bmatrix} \hat{h}_1 & \hat{h}_2 & \hat{h}_3 & \hat{h}_4 \\ \hat{h}_2^* & -\hat{h}_1^* & \hat{h}_4^* & -\hat{h}_3^* \end{bmatrix}$$

Note that the size of G is $2M_R$-by-4.

The actual data detection then proceeds in two steps. In the first step, we detect the intermediate variables $m_{1,1}$, $m_{2,1}$, $m_{3,1}$, $m_{4,1}$, $m_{1,2}$, $m_{2,2}$, $m_{3,2}$, and $M_{4,2}$ as $$\begin{bmatrix} \hat{m}_{1,n} \\ \hat{m}_{2,n} \\ \hat{m}_{3,n} \\ \hat{m}_{4,n} \end{bmatrix} = \begin{bmatrix} \delta^{-1} & 0 & 0 & 0 \\ 0 & \delta^{-1} & 0 & 0 \\ 0 & 0 & \delta^{-1} & 0 \\ 0 & 0 & 0 & \delta^{-1} \end{bmatrix}^{-1} (G^H G + \hat{\sigma}^2 I_4)^{-1} G^H \begin{bmatrix} Y(2N+2n-1) \\ Y^*(2N+2n) \end{bmatrix} n = 1, 2$$

Using the above, the symbols prior to the mapping, $D_1(1)$, $D_1(2)$, ..., $D_1(N)$, ..., $D_4(1)$, $D_4(2)$, ..., $D_4(N)$, can be detected according to the following procedure:

For $l = 1$ to 2

For $n = (l-1)(N/2) + 1$ to $l(N/2)$

Estimate the mapped symbol vector at channel use $n$ $$\begin{bmatrix} \hat{X}_1(n) \\ \hat{X}_2(n) \\ \hat{X}_3(n) \\ \hat{X}_4(n) \end{bmatrix} = (G^H G + \hat{\sigma}^2 I_4)^{-1} G^H \begin{bmatrix} Y(2n-1) \\ Y^*(2n) \end{bmatrix}$$

If $l == 1$ $$\hat{D}_1(n) = \frac{1}{\alpha_1}(\hat{X}_1(n) - \beta) + \hat{m}_{1,l}$$

$$\hat{D}_2(n) = \frac{\hat{X}_2(n)}{\alpha_2} + \hat{m}_{2,l}$$

$$\hat{D}_3(n) = \frac{\hat{X}_3(n)}{\alpha_2} + \hat{m}_{3,l}$$

$$\hat{D}_4(n) = \frac{\hat{X}_4(n)}{\alpha_2} + \hat{m}_{4,l}$$

Else $$\hat{D}_1(n) = \frac{\hat{X}_1(n)}{\alpha_2} + \hat{m}_{1,l}$$

$$\hat{D}_2(n) = \frac{\hat{X}_2(n)}{\alpha_2} + \hat{m}_{2,l}$$

$$\hat{D}_3(n) = \frac{1}{\alpha_1}(\hat{X}_3(n) - \beta) + \hat{m}_{3,l}$$

$$\hat{D}_4(n) = \frac{\hat{X}_4(n)}{\alpha_2} + \hat{m}_{4,l}$$

End

End

End

Embedded Resource Blocks for Relay-Assisted Communication

Our ERB can also be applied to a network including a base-station, a set of mobile-stations and one or more relay stations. The relay stations can be fixed or mobile, and is intended to improve the reliability of information transmission between the base-station and the mobile-stations and to increase the transmission range (or coverage). For simplicity, we denote the mobile-station as source, the base-station as destination and the relay-station as relay. We can as well denote the base-station as source and the mobile-station as destination.

Similar to the ERB mapping for the single-stream network, a set of N−1 symbols at the source, $D(1), D(2), \ldots, D(N-1)$, are inputted to the ERP mapping unit to produce $X(1)$, $X(2), \ldots, X(N)$ as follows:

Step 1: Input $D(1), D(2), \ldots, D(N-1)$, and input the constants $\alpha_1$, $\alpha_2$, and $\beta$.

As an example, the constants $\alpha_1$, $\alpha_2$ and $\beta$ can be selected as follows. With $E_S$ denoting the average energy per each of the N transmitted symbols, by selecting $$\alpha_1 = \sqrt{E_S}$$

$$\alpha_2 = \sqrt{(N-1)E_S}$$

$$\beta = \sqrt{\frac{E_S}{N-1}}$$

we can ensure that each of the mapped symbols $X(1)$, $X(2), \ldots, X(N)$ can be transmitted with an average energy of $E_S$.

Step 2: Perform the mapping $$m = \frac{1}{N-1}\sum_{k=1}^{N-1} D(k)$$

$$X(n) = \alpha_1(D(n) - m) + \beta \quad n = 1, \ldots, N-1$$

$$X(N) = \alpha_2 m$$

Channel Estimation and Data Demodulation for ERB with Relay-Assisted Communication The ERB mapping rule for relay-assisted communication is applicable for various types of relay functionalities. As an example, the relay can perform amplify-and-forward by employing either a fixed gain or a variable gain amplification factor. With $N_T=1$, our ERB mapping rule is applicable for source, relay and destination transmissions within a single OFDM symbol, whereas when $N_F=1$, our ERB mapping rule is applicable for source, relay and destination transmissions on a given sub-carrier tone.

We now describe methods of channel estimation, noise-variance estimation, and data detection at the relay and the destination for an example relay network in which the relay performs amplify-and-forward signal processing.

The low-pass baseband received signal at the destination from the source is given by $$Y_{SD}(n) = h_{SD}X(n) + w_{SD}(n) \quad n=1,2,\ldots,N,$$

where $h_{SD}$ is the vector-valued channel gain that is of size $M_R$-by-1. The variables $Y_{SD}(n)$ and $w_{SD}(n)$ are also of size $M_R$-by-1. We also assume that each element of noise $w_{SD}(n)$ has a variance of $\sigma_{SD}^2$.

In a similar manner, the signal at the relay from the source is given by $$Y_{SR}(n) = h_{SR}X(n) + w_{SR}(n) \quad n=1,2,\ldots,N$$

where $h_{SR}$ is the vector-valued channel gain that is of size $M_R$-by-1. The variables $Y_{SR}(n)$ and $w_{SR}(n)$ are also of size $M_R$-by-1. We also assume that each element of noise $w_{SR}(n)$ has a variance of $\sigma_{SR}^2$.

An estimate of $h_{SD}$ at the destination is given by $$\hat{h}_{SD} = \frac{1}{(N-1)\beta} \sum_{n=1}^{N-1} Y_{SD}(n) = h_{SD} + \frac{1}{(N-1)\beta} \sum_{n=1}^{N-1} w_{SD}(n).$$

In a similar manner, an estimate of $h_{SR}$ at the destination is given by $$\hat{h}_{SR} = \frac{1}{(N-1)\beta} \sum_{n=1}^{N-1} Y_{SR}(n) = h_{SR} + \frac{1}{(N-1)\beta} \sum_{n=1}^{N-1} w_{SR}(n).$$

Using the channel estimate $\hat{h}_{SR}$, an estimate of the source signal $X(n)$, $n=1,\ldots,N$, at the relay is given by $$X_R(n) = G_{AF} \frac{\hat{h}_{SR}^H Y_{SR}(n)}{\hat{h}_{SR}^H \hat{h}_{SR}} n = 1, 2, \ldots, N,$$

where $G_{AF}$ is the amplifier gain of the relay.

When the relay transmits its signal to the destination, the received signal at the destination is given by $$Y_{RD}(n) = h_{RD}X_R(n) + w_{RD}(n) \quad n=1,2,\ldots,N.$$

An estimate of $h_{RD}$ at the destination is given by $$\hat{h}_{RD} = \frac{1}{(N-1)\beta} \sum_{n=1}^{N-1} Y_{RD}(n) = h_{RD} + \frac{1}{(N-1)\beta} \sum_{n=1}^{N-1} w_{RD}(n).$$

Estimates of noise variances at the destination, due to source and the relay, are $$\hat{\sigma}_{SD}^2 = \left(\frac{1}{N} \sum_{n=1}^{N} \left|\frac{\hat{h}_{SD}^H Y_{SD}(n)}{\hat{h}_{SD}^H \hat{h}_{SD}}\right|^2 - 1\right) \hat{h}_{SD}^H \hat{h}_{SD}$$

$$\hat{\sigma}_{RD}^2 = \left(\frac{1}{N} \sum_{n=1}^{N} \left|\frac{\hat{h}_{RD}^H Y_{RD}(n)}{\hat{h}_{RD}^H \hat{h}_{RD}}\right|^2 - 1\right) \hat{h}_{RD}^H \hat{h}_{RD}$$

Finally, estimates of $D(1), \ldots, D(N-1)$, at the destination are given by $$D(n) = \frac{1}{\alpha_1}(\hat{X}(n) - \beta) + \hat{m} \quad n = 1, \ldots, N-1$$

where $\hat{X}(n) = \left(\dfrac{\dfrac{\hat{h}_{SD}^H Y_{SD}(n)}{\hat{\sigma}_{SD}^2} + \dfrac{\hat{h}_{RD}^H Y_{RD}(n)}{\hat{\sigma}_{RD}^2}}{\dfrac{\hat{h}_{SD}^H \hat{h}_{SD}}{\hat{\sigma}_{SD}^2} + \dfrac{\hat{h}_{RD}^H \hat{h}_{RD}}{\hat{\sigma}_{RD}^2}}\right) n = 1, \ldots, N-1$ and $\hat{m} = \dfrac{1}{\alpha_2}\left(\dfrac{\dfrac{\hat{h}_{SD}^H Y_{SD}(N)}{\hat{\sigma}_{SD}^2} + \dfrac{\hat{h}_{RD}^H Y_{RD}(N)}{\hat{\sigma}_{RD}^2}}{\dfrac{\hat{h}_{SD}^H \hat{h}_{SD}}{\hat{\sigma}_{SD}^2} + \dfrac{\hat{h}_{RD}^H \hat{h}_{RD}}{\hat{\sigma}_{RD}^2}}\right).$ It is important to point out that the selected values for the constants $\alpha_1$, $\alpha_2$ and $\beta$ as described above are only exemplary, and other choices of $\alpha_1$, $\alpha_2$ and $\beta$ is also possible that allows us to transmit the symbols at the output of the ERB mapping unit with variable transmission power.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for encoding data symbols in a transmitter of a wireless network, comprising the steps of:

providing a set of data symbols to a transmitter to be transmitted, wherein each data symbols is selected from a set of modulation constellations;

determining a sample-mean of the set of data symbols;

shifting each data symbol by the sample-mean to obtain a shifted data symbol;

multiplying the shifted data symbol by a first constant to obtain a scaled data symbol, wherein the first constant depends on a first function of the energy of the set of data symbols;

adding a second constant to the scaled data symbol to obtain a mapped data symbol, wherein the second constant depends on a second function of the energy of the set of symbols;

multiplying the sample-mean by a third constant to obtain a sample-mean mapped symbol;

transmitting, over a channel, the set of mapped data symbols and the sample-mean mapped symbol as a resource block, wherein the steps are performed in the transmitter.

2. The method of claim 1, wherein the resource block includes time-frequency resource units spanned by $N_T$ consecutive mapped data symbol.

3. The method of claim 2, where $N_F$ is greater than 1, and $N_T=1$.

4. The method of claim 2, where $N_F$ equals 1, and $N_T$ is greater than 1.

5. The method of claim 2, wherein $N_F$ and $N_T$ are both greater than 1.

6. The method of claim 1, wherein the modulation constellation is selected from a group consisting of quadrature phase shift keying, 16-quadrature amplitude modulation (QAM), and 64-QAM.

7. The method of claim 2, wherein the set of symbols is $D(1), D(2), \ldots, D(N-1)$, the set of constants $\alpha_1, \alpha_2$ and $\beta$ is, and the mapping is according to $$m = \frac{1}{N-1} \sum_{k=1}^{N-1} D(k)$$

$$X(n) = \alpha_1(D(n) - m) + \beta \quad n = 1, \ldots, N-1$$

$$X(N) = \alpha_2 m$$

where $X(1), X(2), \ldots, X(N)$ are the mapped data symbols, m is a sample-mean of the N−1 data symbols $D(1), D(2), \ldots, D(N-1)$, $X(N)$ is the sample-mean mapped symbol, , n is an index for the time-frequency resource units for transmission, and k is a dummy variable.

8. The method of claim 7, wherein $E_S$ is the average energy of each of the N mapped data symbols $X(1), X(2), \ldots, X(N)$, and the constants $\alpha_1, \alpha_2$ and $\beta$ 211 are respectively selected according to the following functions as $$\alpha_1 = \sqrt{E_S}$$

$$\alpha_2 = \sqrt{(N-1)E_S}$$

$$\beta = \sqrt{\frac{E_S}{N-1}}.$$

9. The method of claim 7, wherein a spectral efficiency of the resource block is (N−1)/N.

10. The method of claim 7, further comprising:
receiving the mapped data symbols as received symbols;
summing the received symbols as a sum;
scaling the sum by β(N−1).

11. The method of claim 8, further comprising:
partitioning the set of data symbols into K stream; and
transmitting each stream with a different antenna of the transmitter using a fourth constant $$\delta = \sqrt{\frac{E_S N}{K}}.$$

The method of claim 7, wherein an effective noise random variable $$\sum_{n=1}^{N-1} Z(n)$$

is scaled by β(N−1).

12. The method of claim 10, further comprising:
selecting β to reduce a variance of noise.

13. The method of claim 10, further comprising:
increasing a number of the mapped data symbols to reduce a variance of noise.

\* \* \* \* \*